United States Patent Office 2,770,593
Patented Nov. 13, 1956

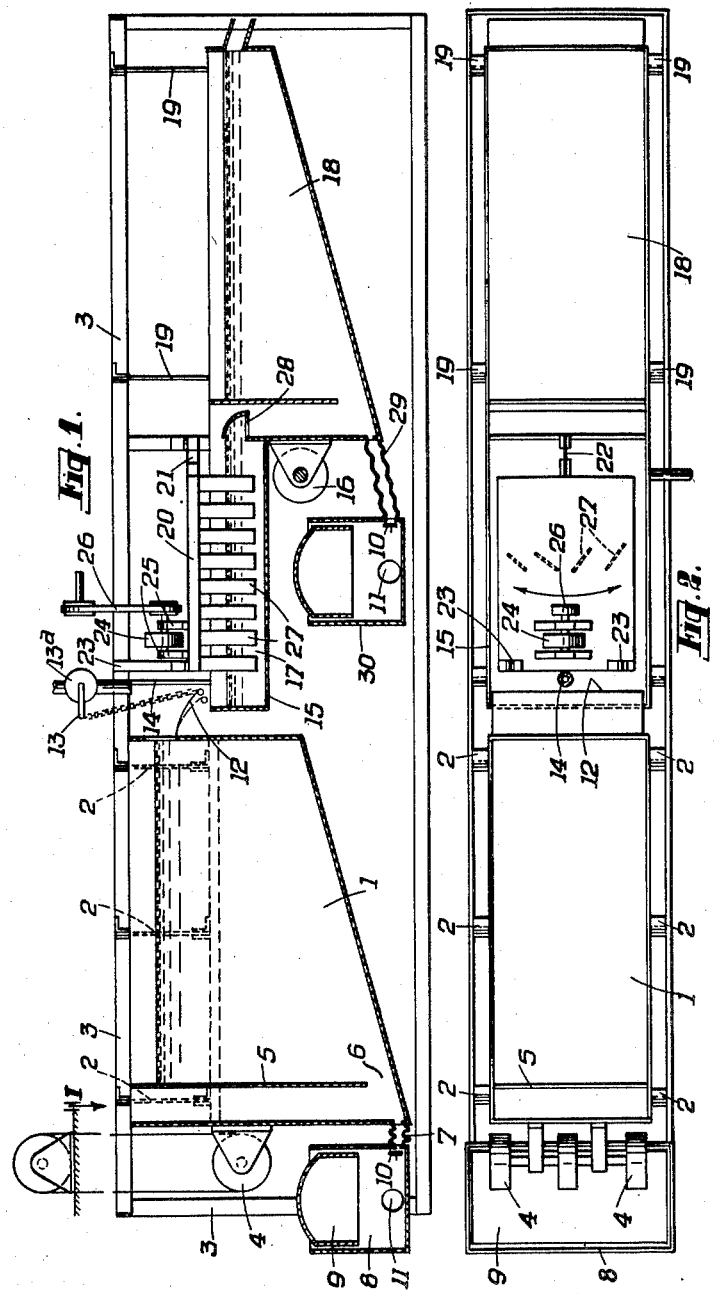

2,770,593

PURIFICATION OF WASTE WATER

Hans Heymann, Ulm (Danube), Germany

Application May 23, 1951, Serial No. 227,779

5 Claims. (Cl. 210—16)

This invention concerns the purification of waste water.

In the purification of waste water, there are three distinct tasks. These are: firstly, the purely mechanical precipitation of the suspended substances contained in the waste water; secondly, the elimination of the acids contained in the waste water by chemical methods; and, thirdly, the cleansing of living matter such as bacteria from the waste water.

The present invention is concerned with the two first mentioned tasks.

Firstly, as regards the precipitation of the suspended substances, this has hitherto been done by exclusively mechanical methods by means of so-called settling basins. The waste water is conducted into these basins so that the direction of the inflowing current is opposite to that in which the purified water is discharged. This measure serves to give the heavy suspended substances an opportunity of settling as soon as possible. The size of the base of the basin is made such that the top layer of liquid passes an overflow weir with a speed of flow of only a few millimetres per second. The physical laws of the settling process has hitherto been imperfectly understood. The sinking or settling process obviously differs for the various types of waste water. Considered from a practical viewpoint, only the settling process in the top layer is of interest, and, in fact, within a height which corresponds to the height of the overflow. With the above-mentioned speed of flow of a few millimetres per second, experience shows that settling speeds of a few fractions of a millimetre per second are to be reckoned with. As a consequence, in the case of sewerage plants for a medium-sized town, it is necessary to work with settling basins of which the surface area amounts to several hundred square metres. The precipitated sludge collects on the bottom of the basin, which possesses, oppositely to the direction of discharge, a sharp gradient followed by special, funnel-like recesses for collecting the sludge. The basin and the sludge funnels penetrate into the ground for a depth of several metres, and must therefore be sealed against the admission of ground water. If, in addition, account is taken of the precautions which are necessary for withdrawing the precipitated sludge within certain time intervals for the purpose of industrial utilisation, then construction costs arise which form an extremely heavy burden upon the budget of a town. The costs are, in fact, so high that even large industrial works can hardly be expected to provide their own plant, to say nothing of the worthy intention of equipping every house, or at least every fairly large block of houses, with a special plant in order to relieve the municipal plant.

With regard to the second task: this has hitherto generally been done following the mechanical purifying, with the addition of certain chemicals, the nature of which is determined by the constitution of the acids to be dealt with. The quantity of these additions is purely a matter of experience, according to which more additional substances must generally be used than is theoretically necessary for carrying out the chemical process. The reason for this resides in the incomplete mixing of the additional substances with the waste water to be treated within the sections of route available.

Generally speaking, the procedure is that the additional substance is introduced by means of a special dosing device, of which a height of drop of about one metre is lost because of the natural gradient of the plant. The dosing device feed is then followed by mixing, for which a certain height of drop is also necessary, so that the entire operation necessitates a large constructional length in conjunction with pumping installations and therefore causes disproportionately high construction and maintenance costs.

The present invention is the result of comprehensive observations which originated from observance of the physical laws involved in the two tasks. The invention set itself the objective of solving both problems continuously, i. e. while the waste water is flowing through a system of channels, in order thereby, especially in the case of new plants, to do away with the previous expensive concrete structures. The two tasks are dealt with separately, and successively, it being possible for the necessary apparatuses to work in close union or separately from each other as regards location.

If it is a question of relieving or enlarging already existing plants, the invention also affords the opportunity of fitting the apparatuses into an existing plant as additions without much expense.

Firstly, as concerns the primary task (the precipitation of the suspended particles contained in the waste water), the invention is foreseen by recognising that the settling process of each suspended particle can be accelerated considerably as compared with previous processes if the boundary layer friction between the surface of the particles and the liquid moistening them is reduced by mechanical vibrations which are distributed homogeneously over the entire liquid column and are made so weak that no kind of turbulent movements of the liquid can arise. At the same time, the invention proceeds from recognition that in this way the best possible results are obtainable if the characteristics of the vibration, i. e. its duration, its frequency and amplitude, and above all its direction are specially adapted to the nature of the waste water.

According to the invention, the homogeneous penetration of the liquid column by the vibration can be obtained by means of special agitators, which dip into the waste water being treated, suspended for instance by tensioned strings or bands, and which are agitated from outside in known manner to form ground or top vibrations. Considered from a practical standpoint, these immersion agitators do not afford any gaurantee that individual strings or bands do not drop out of action owing to pollution and the like and impair the homogeneous penetration of the liquid column, and for this reason the invention preferably works with the simultaneous agitation of all the liqid particles, by agitating the passage channel as a whole to suitable vibrations. It is able to do this all the more easily, because with homogeneous penetration of the entire liquid column and correct harmonising or dosing of the mechanical vibration, a considerable improvement of the settling process is obtained, so that it is possible to work with substantially higher flow through speeds and in conjunction therewith to work with smaller channel cross-sections. Expressed in figures, the speed of flow at the overflow weir can be increased, with equally efficient settling, to about 200–300 mm. per sec. as compared with the previous speed of about 3–5 mm. per sec. so that the dimensions of the plant shrink to a fraction of the previous requirements.

If, in accordance with the invention, the base of the channel is given a small gradient oppositely to the direction of flow, the said gradient opening into a sump-like recess, then the precipitated sludge is moved slowly forwards in the direction of the sump by the small vibrations of the base of the channel.

The invention therefore makes it possible to transfer the sludge automatically into a special collecting container through a resilient mouthpiece, which container is preferably equipped after the pattern of a gasometer with a floating cover and is provided with an inflow and discharge valve so that it can be drained at certain intervals of time without the action of the actual purifying plant being interrupted, as has hitherto been the case because the sludge has to be conveyed into the sludge-collecting container by means of special apparatus. Since with vibration conveying the sludge becomes compacted i. e. automatically compressed, there results according to the invention the further considerable advantage that the sludge can be dried more easily and more cheaply when eventually withdrawn.

Referring now to the second task, the chemical elimination of accompanying acids, the invention has its origin in the realisation that a minimum of added substances is adequate if on the shortest route section the surface of the liquid to be cleansed is constantly enlarged and renewed by means of mechanical vibrations, i. e. if greatest turbulences are produced in the smallest space, which is achieved particularly by exposing each particle of liquid simultaneously in several directions to a changing acceleration. According to the invention, the arrangement must, however, be so devised that the turbulences become weaker and weaker over a small route section and finally become so small that the liquid column can become calm again. The invention therefore provides for the channel to be agitated as a whole and for an additional agitator to plunge into the liquid at the same time from above, which agitator carries out horizontal pendulum vibrations of the greatest possible amplitude about a stationary pole located at the end of this mixing section. This immersion agitator is provided with adjustable blades which are immersed as far as the base of the channel. Behind the pole of this additional agitator is connected a channel, which is rigidly coupled on and which is constructed after the pattern of the mechanical purifier, only with the difference that its dimensions can be kept correspondingly smaller. This can in turn be coupled with a stationary sludge collector in order to receive the sludge accumulating during the chemical cleansing.

In view of the fact that the quantity of waste water flowing in is subject to constant fluctuation, it must be possible to regulate the dosing of the added substances. This is done in the most simple manner according to the invention by constructing the outlet spout of the first mechanical purifier as a resilient tongue, the change in the amount of sag of which is adapted mechanically or electrically to control automatically the inflow cock for the added substance.

A preferred form of construction of the invention is shown by way of example in Figs. 1 and 2. It is assumed here that one is concerned with a new plant, in which both tasks are to be performed directly one after the other.

In the drawings:

Fig. 1 shows a longitudinal section through the plant as a whole.

Fig. 2 is a plan view corresponding to Fig. 1, the actual super-structure being omitted.

According to Fig. 1, waste water is introduced into the first purifier in the direction of the arrow I. This purifier consists of a sheet metal container 1 of trapezoidal longitudinal section which is resiliently suspended in the frame 3 by means of link springs 2. Agitation is effected in known manner by means of a rotation un- balanced mass 4 mounted at the head of the container 1. At the inlet to the container 1, a separating wall or baffle 5 extends downwards almost to the bottom of the container 1, so that the main part thereof is fed from the bottom. The opening 6 between the separating wall 5 and the base of the container 1 is made of such magnitude that the precipitated sludge, which travels automatically on the base oppositely to the direction of flow, can pass through a resilient intermediate channel 7, without hindrance, into a storage container 8, which is provided after the pattern of a gasometer with a floating cap 9 and can be drained mechanically through closable openings 10 and 11. The length of the container 1 can be somewhat shortened in given cases in view of the second purifing process which follows. At the mouth of the purifier, the purified waste water runs over a highly resilient tongue 12, which sags to a varying extent under the weight of the quantity running over. The end of this tongue 12 is connected to the lever 13 of a cock 13a fitted in the inflow pipe 14 for the added substances, which are employed for the subsequent chemical cleansing of the waste water. The added substance and the purified water pass in exactly dosed quantities to the second container 15, which is likewise constructed as a vibrating container. The agitation of this container 15 is also effected by means of a rotating unbalanced mass 16 mounted in the middle part of the plant on the vertical wall of the actual purifier 18.

The front part of the combined second and third containers is constructed as a flat gutter 17, which, together with the purifier container 18 following it, is also suspended in link springs 19. Above this gutter 17, an immersion agitator 20 is fitted into the frame 3 in such a manner that it is capable of carrying out vibrations in the horizontal plane about the pole 21. This pole 21 is formed according to the example of construction by a flat spring 22. The casing of the immersion agitator 20 is situated above the level of the water and is suspended in the frame 3 at the front end by means of two link springs 23. In order to reduce the driving output, the agitator 20 can be supported laterally against the frame 3 by means of draw springs. This construction is not shown in the drawings. The agitating is likewise effected by means of a rotating unbalanced mass 24, which is fitted on the surface of the immersion agitator 20 by means of the bearing 25 and is set into action from above by means of a belt drive 26. Below the frame of the immersion agitator, there is provided a number of vanes 27 which are located with their blade surface obliquely towards the direction of flow (Fig. 2) the setting angle of the blades of the vane being adjustable according to requirements. In the direction of the pole 21, the vibrations of the vanes 27 decrease linearly, so that at the pole, the mixing action ceases. The liquid here then enters the after purifier 18 by way of the overflow weir, the after-purifier being constructed according to the pattern of the mechanical purifier 1. This purifier 18 is also connected by means of a resilient intermediate piece 29 to a sludge storage container 30, which corresponds to the sludge cleanser 8, 9, 10, 11.

I claim:

1. An apparatus for the purification of waste water consisting of a vibratable structure defining a flow path for said water, said structure comprising a first resiliently suspended preliminary purifying container, a second resiliently suspended afterpurifying container, a resiliently suspended mixing gutter between said first and second containers, and a highly resilient tongue between said first container and said mixing gutter, over which the water is constrained to flow, means for closing chemical additives to said mixing gutter, means for controlling said dosing means, said means for controlling being operatively connected to said tongue so that the amount of additive is directly governed by the amount of water passing over said tongue, a storage container and a resilient connection thereto for each of said first and second containers, the bases of said first and second containers being inclined against the direction of flow of said water and having outlet openings to said resilient connections to said storage containers for leading off sludge, an agitator for mixing said additives within said gutter, and angularly adjustable vanes on said agitator, adapted to dip into the water flowing along said gutter, said agitator being resiliently suspended so as to be capable of vibrating horizontally about a fixed pole, the amplitude of vibration decreasing in the direction of said pole.

2. An apparatus for the purification of liquid comprising a first resiliently suspended preliminary purifying container, means for vibrating said first container, said first container having an outlet weir, a horizontally disposed mixing gutter positioned to receive liquid flow from said outlet weir, means for adding treating agents to said liquid in said mixing gutter in proportion to liquid flow from said weir into said gutter, an immersion agitator means resiliently mounted for arcuate vibration in a horizontal plane about an axis positioned adjacent the outlet of said mixing gutter whereby the amplitude of vibration of said agitator means decreases in the direction of said axis, and a second purifying container in communication with the outlet of said mixing gutter.

3. An apparatus for the purification of liquid comprising first and second resiliently suspended purifying sections, means for independently vibrating each of said sections, said first section having a liquid outlet means communicating with the liquid inlet means of said second section, said second section comprising a horizontally disposed mixing gutter receiving liquid discharged from the outlet of said first section, means for adding treating agents to said liquid in said mixing gutter in proportion to liquid flow from said first section into said mixing gutter, immersion agitator means in said mixing gutter, said immersion agitator means being resiliently mounted for arcuate vibration in a horizontal plane about an axis positioned adjacent the outlet of said mixing gutter whereby the amplitude of vibration of said agitator means decreases in the direction of said axis, said second section comprising a second purifying container in communication with the outlet of said mixing gutter.

4. An apparatus for the purification of water comprising a liquid receiving means, an immersion agitator means disposed in said liquid receiving means, said agitator means being mounted for arcuate vibration in a horizontal plane about an axis positioned adjacent said liquid receiving means whereby the amplitude of vibrations of said agitator means decreases in the direction of said axis.

5. An apparatus for the purification of water comprising a liquid receiving means having an inlet and an outlet, an immersion agitator means mounted for arcuate vibration in a horizontal plane about an axis positioned adjacent the outlet of said liquid receiving means whereby the amplitude of vibration of said agitator means decreases in the direction of said axis.

References Cited in the file of this patent

UNITED STATES PATENTS

| | | |
|---|---|---|
| 756,305 | Weller | Apr. 5, 1904 |
| 947,783 | Bartlett | Feb. 1, 1910 |
| 1,149,045 | Greth et al. | Aug. 3, 1915 |
| 1,170,558 | Nonnenbruch | Feb. 8, 1916 |
| 1,662,180 | Ball | Mar. 12, 1928 |
| 1,983,968 | Clark | Dec. 11, 1934 |
| 2,070,201 | Geary | Feb. 9, 1937 |
| 2,116,053 | Urbain et al. | May 3, 1938 |
| 2,120,634 | Stevenson | June 14, 1938 |
| 2,270,616 | Bell | Jan. 20, 1942 |
| 2,278,723 | Malsbury et al. | Apr. 7, 1942 |
| 2,353,602 | Trotter | July 11, 1944 |
| 2,368,055 | Walker | Jan. 23, 1945 |
| 2,422,062 | Yard | June 10, 1947 |
| 2,462,878 | Logue | Mar. 1, 1949 |
| 2,498,292 | Naugle | Feb. 21, 1950 |
| 2,525,936 | Owen | Oct. 17, 1950 |
| 2,540,517 | Glasco | Feb. 6, 1951 |

FOREIGN PATENTS

| | | |
|---|---|---|
| 231,271 | Germany | Feb. 20, 1911 |
| 217,025 | Great Britain | June 12, 1924 |
| 352,326 | Great Britain | July 9, 1931 |